Figure 1:
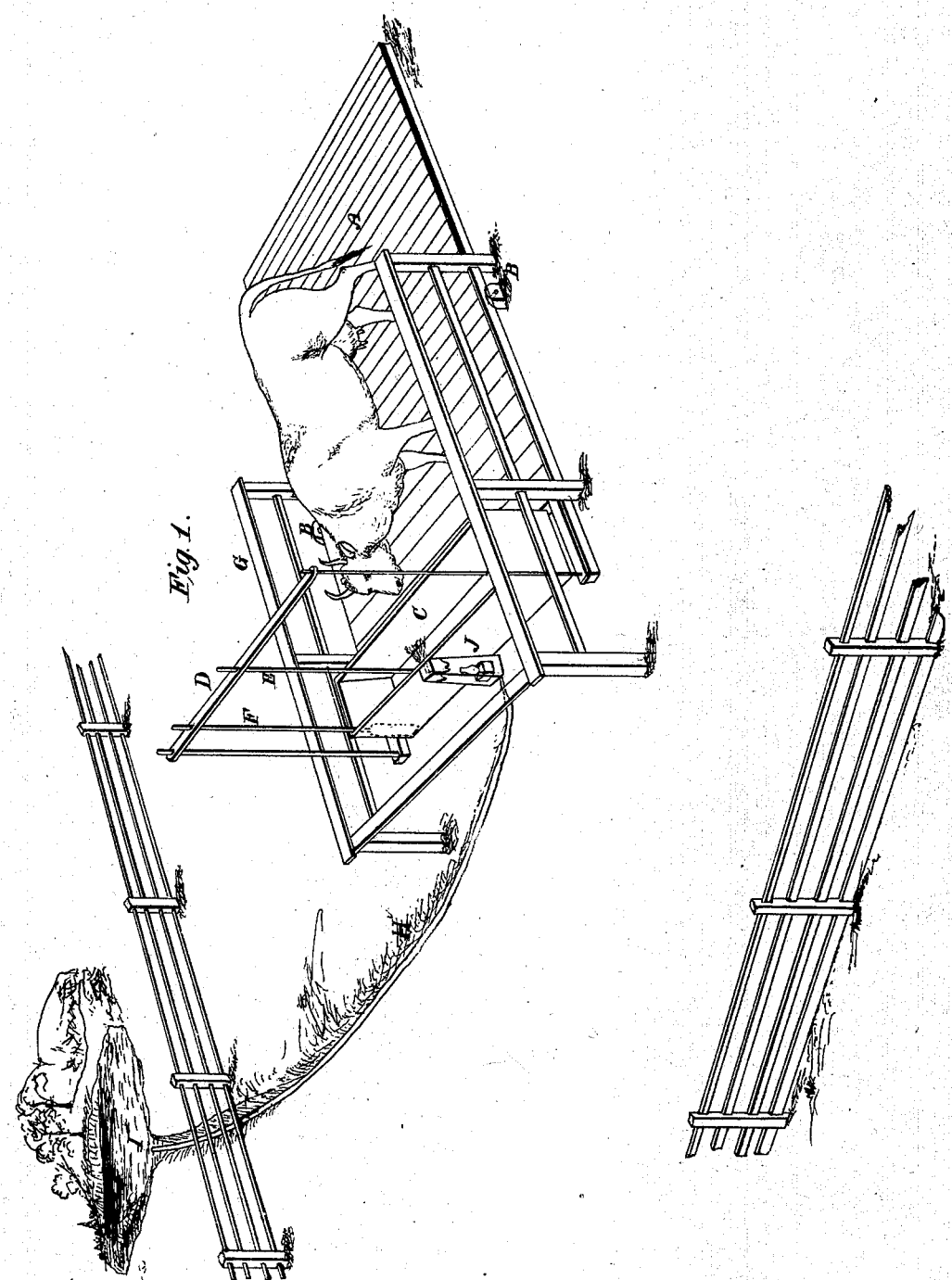

2 Sheets--Sheet 1.

J. COMPTON.
Hydrants for Watering Stock.

No. 146,319. Patented Jan. 13, 1874.

Witnesses:
John W House
H. M. Brosius

Inventor:
James Compton

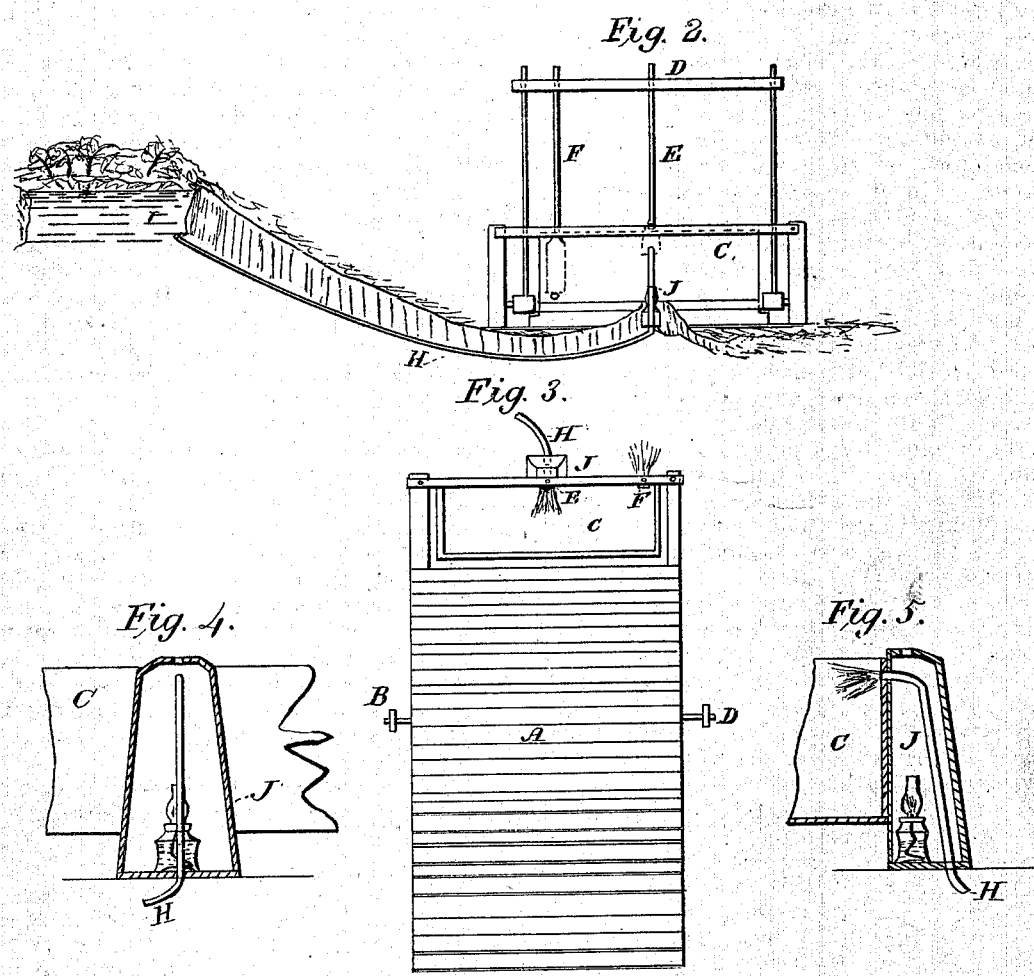

UNITED STATES PATENT OFFICE.

JAMES COMPTON, OF DEER RIDGE, MISSOURI.

IMPROVEMENT IN HYDRANTS FOR WATERING STOCK.

Specification forming part of Letters Patent No. 146,319, dated January 13, 1874; application filed June 16, 1873.

*To all whom it may concern:*

Be it known that I, JAMES COMPTON, of Deer Ridge, Lewis county, Missouri, have invented a Hydrant for Watering Stock, of which the following is a specification:

My invention relates to certain devices by which stock of any kind weighing fifteen pounds, or over, may water themselves by their own weight, actions, and instincts. The object of my invention is to supply stock with pure water from ponds and fountains at all seasons of the year.

Figure 1 is a side view of my machine. Fig. 2 is a rear view of frame-work, slides, trough, projecting ends of platform, pipe, and pond. Fig. 3 is a combined view of platform and trough with discharging end of the pipe entering the trough. Fig. 4 shows rear view of case, lamp, and pipe; Fig. 5 side view of the same.

A, Fig. 1, is the platform, which should be substantially constructed to prevent careening from the weight of a heavy animal. B B is the fulcrum, and should be about three inches in diameter, round, and securely fastened to the under side of the platform in the center, the ends of the fulcrum to be fastened with iron staples, and placed on a flat sleeper sunk in the ground. C is the trough, resting on a sleeper placed in the ground deep enough to bring the bottom of the trough at least ten inches below the bottom of the pond, said sleeper to be a foot or two longer than the width of the platform, so as to sustain the projecting ends of the platform that receive the frame-work. D is a frame-work attached to the projecting ends of the platform A. The animal desiring water passes over the platform A, and arriving at the trough, depresses the framed end of the platform. The slides E F will also be depressed, bringing the hole in the center slide opposite the discharging end of the pipe, thereby permitting the water to flow through the hole in the slide into the trough. The corner slide, being also depressed, will close a hole in the bottom of the trough at the corner, thus retaining the water in the trough while the animal is drinking; but as soon as the animal returns to the side of the fulcrum from the trough, the openings are reversed by the depression of this end of the platform, and consequent raising of the frame-work and slides, thus stopping the flow of the water into the trough at the center, and allowing it to escape through the hole in the corner, thereby preventing the formation of ice during freezing weather. During the warm seasons of the year, the corner slide may be removed and the hole plugged. E, center slide, with hole in lower end; F, corner slide, with lower end sufficiently large to cover opening in the bottom of the trough. G is a fence partly inclosing the platform, so as to compel the animal to pass on and off at the back end of the same. H is the pipe connecting the pond and trough, through which the water is conveyed into the same. The pipe should be buried sufficiently deep in the earth to prevent freezing. I is the pond. J is the case or closet through which passes the discharging end of the pipe. At the bottom of this case is placed a burning lamp, to prevent the formation of ice in this part of the pipe, or thaw it out should it be allowed to accumulate.

I have had one of my machines in practical operation for over four months, substantially as described.

I claim—

The combination of the pivoted platform A, frame B, and slides E F, controlling, respectively, the inlet and outlet openings of water-trough C, all constructed and arranged substantially as described.

JAMES COMPTON.

Witnesses:
J. M. LEVENGOOD,
I. N. SMOOT.